United States Patent [19]
McCarty et al.

[11] 3,901,077
[45] Aug. 26, 1975

[54] ULTRASONIC FLOWMETER

[75] Inventors: Kenneth McCarty; John Patrick Woodcock, both of Penarth, England

[73] Assignee: National Research Development Corporation, London, England

[22] Filed: July 9, 1974

[21] Appl. No.: 486,917

[30] Foreign Application Priority Data
May 4, 1974 United Kingdom............... 9624/74

[52] U.S. Cl............................ 73/194 A; 128/2.05 F
[51] Int. Cl.²........................................... G01F 1/66
[58] Field of Search .. 73/194 A; 128/2.05 F, 2.05 Z

[56] References Cited
UNITED STATES PATENTS

| | | | |
|---|---|---|---|
| 3,498,290 | 3/1970 | Shaw et al. | 73/194 A X |
| 3,554,030 | 1/1971 | Peronneau | 73/194 A |
| 3,741,014 | 6/1973 | Tamura | 73/194 A |
| 3,777,740 | 12/1973 | Hokanson | 128/2.05 Z X |

OTHER PUBLICATIONS

Gosling et al., "Transcutaneous Measurement of Arterial Blood–Velocity by Ultrasound ", Ultrasonics for industry Conference Papers, Oct. 1969, pp. 16–23.

*Primary Examiner*—Charles A. Ruehl
*Attorney, Agent, or Firm*—Cushman, Darby & Cushman

[57] ABSTRACT

An ultrasonic flowmeter for measurement of liquid flow volume in a duct, particularly for transcutaneous measurement of blood flow rates, employs a signal of linearly varying frequency to measure the diameter of the blood vessel and the direction of blood flow, and employs a signal of constant frequency to measure the flow velocity. The signal of linearly varying frequency may also be used to determine the flow profile. From this information, the flow volume rate is obtained.

8 Claims, 11 Drawing Figures

ULTRASONIC FLOWMETER

This invention relates to ultrasonic doppler flowmeters and has particular application to transcutaneous flowmeters for measuring blood flow rates.

Currently used transcutaneous ultrasonic flowmeters are velocity measuring instruments and are not capable of measuring volume flow. In such known velocity meters, a piezoelectric transducer is excited by means of a low energy, continuous sinusoidal oscillation and the ultrasonic beam is directed through the skin to the blood vessel being investigated. Reflection of the incident beam occurs at any change of acoustic impedance in the beam path including the blood vessel walls, and scattering occurs from moving blood cells. The reflected and scattered components of the wave are received at a second transducer and mixed with part of the transmitted wave. The output of the mixing stage is then fed into a low pass filter, which may take the form of an audio frequency amplifier, and thence to a display unit such as an audio spectrum analyzer. Although reflections occur from any change of acoustic impedance in the beam path, there is an output from the mixer only when the transmitted and received signals differ in frequency. This occurs only when reflection or scattering is produced from a moving target, the output being the doppler-shift frequency. Thus, only moving targets are detected.

It is an object of the present invention to provide an ultrasonic flowmeter for measuring volume flow.

According to the invention in one aspect an ultrasonic flowmeter for measurement of liquid flow volume in a duct comprises a transmitting transducer, a variable frequency oscillator having its output connected to the input of the transmitting transducer, a receiving transducer arranged to receive reflections and scattering of signals from the transmitting transducer, an audio spectrum analyzer, difference signal means responsive to the receiving transducer for supplying to said audio spectrum analyzer difference signals of frequency equal to the difference between the frequency of the signal transmitted by the transmitting transducer and the reflected and scattered signals received by the receiving transducer, and control means for generating a control signal for the variable frequency oscillator, such control signal comprising periods of linearly varying level.

According to a preferred form of the invention, the control signal for the variable frequency oscillator comprises periods of constant level and periods of linearly varying level.

The beam width of the transmitting transducer may be less than the internal diameter of the duct in which liquid flow is to be measured and preferably is about half of this diameter.

In many circumstances, there will be sufficient direct coupling or indirect leakage (either electrical or mechanical) between the transmitting transducer and the receiving transducer to provide the required difference signal for the audio spectrum analyzer at the output of the receiving transducer. If there is no such direct coupling, it is necessary to supply the output of the receiving transducer to the audio spectrum analyzer via a mixer which also has an input connected to the output of the variable frequency oscillator.

According to the invention in another aspect, a method of measuring the volume flow through a duct employing an ultrasonic flowmeter having a transmitting transducer, a receiving transducer disposed to receive reflection and scattering of signals from said transmitting transducer, an audio spectrum analyzer and means for supplying to said audio spectrum analyzer a signal of frequency equal to the difference between the frequency of the signal transmitted by the transmitting transducer and the reflected and scattered signals received by the receiving transducer, comprises successively applying an ultrasonic signal of constant frequency to the transmitting transducer to measure the velocity of flow of liquid in the duct and applying an ultrasonic signal of linearly varying frequency to the transmitting transducer to measure the diameter of the duct.

In order that the invention may be more readily understood, an embodiment thereof will now be described, by way of example, with reference to the accompanying drawings, in which.

Figure 1:
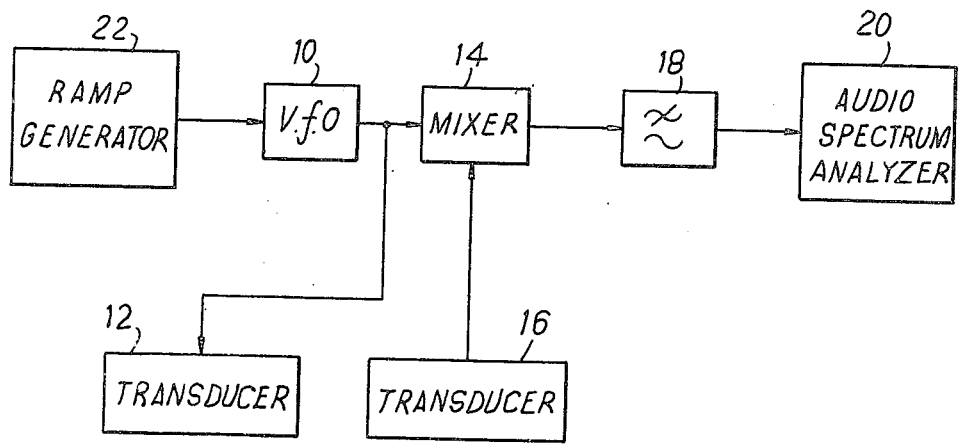
FIG. 1 is a block schematic diagram of an ultrasonic flowmeter in accordance with the invention.

Referring first to FIG. 1, an ultrasonic flowmeter comprises an oscillator 10 having its output connected both to a transmitting transducer 12 and a mixer 14. The mixer 14 also has an input connected to the output of a receiving transducer 16. The output of the mixer 14 is connected via a low-pass filter 18 to an audio spectrum analyzer 20.

The transducer 12 has a beam width narrower than a blood vessel in which blood flow rate is to be measured. In use, the beam from the transistor 12 is directed on to such a blood vessel at an angle other than 90° to the direction of flow. Scattered and reflected signals are received by the transducer 16. The resulting output of the mixer 14 consists only of sum and difference signals produced when the frequency of the signals received by the transducer 16 differs from the frequency of the signals transmitted by the transducer 12, for example due to doppler shifting. The filter 18 passes only the low frequency difference signals and these are applied to the audio spectrum analyzer 20.

As already mentioned, if there is sufficient direct coupling between the transducers 12 and 16, the mixer 14 may be dispensed with, the output from the transducer 16 being directly coupled to the input of the filter 18. In this case, the receiving transducer 16 is itself serving as a mixer.

Figure 2:
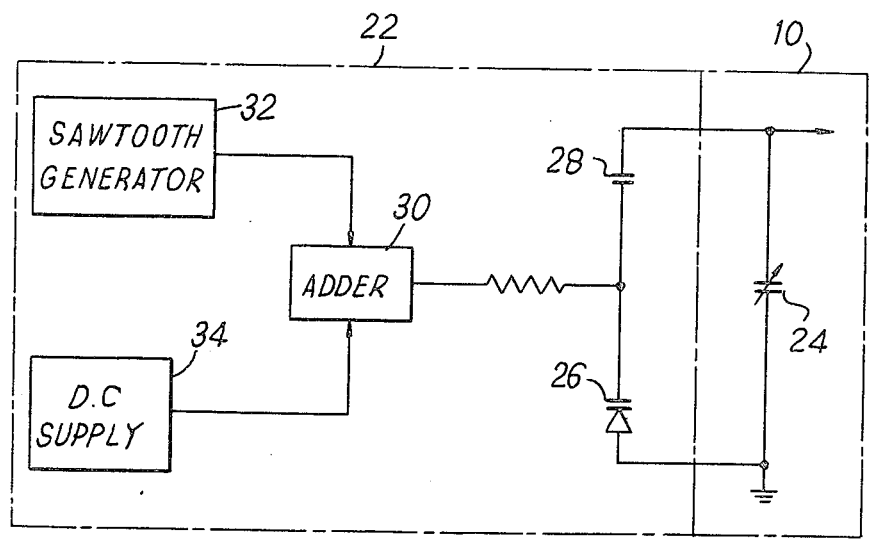
FIG. 2 is a schematic diagram illustrating, in more detail, part of the flowmeter shown in FIG. 1.

The apparatus described so far constitutes a conventional ultrasonic flowmeter. In accordance with the present invention, the oscillator 10 is a voltage control oscillator and receives a control signal from a ramp generator 22. FIG. 2 shows a suitable ramp generator 22 for use when the rest of the apparatus comprises a Parkes 803 flowmeter. The oscillator 10 of such a flowmeter includes a variable capacitor 24, adjustment of the capacitance of which alters the output frequency of the oscillator to match it to the transducer 12. In the ramp generator 22, a variac diode 26 and a capacitor 28 are connected in series with one another and in parallel with the capacitor 24. The capacitance of the variac diode 26 or course varies with the potential difference across it and a potential difference for this purpose is applied from an adder 30 which has one input connected to the output of a sawtooth generator 32 and the other to the output of a d.c. supply unit 34. Thus, the voltage applied to the variac diode 26 consists of a d.c. pedestal derived from the unit 34 and a varying component derived from the sawtooth generator 32. The capacitor 28 isolates the d.c. component from the voltage controlled oscillator 10.

Figure 3:
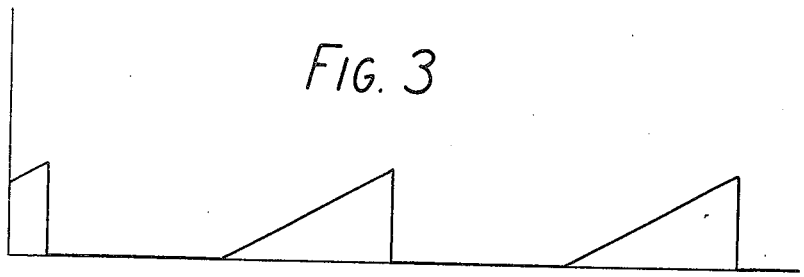
FIG. 3 is a waveform diagram illustrating the output of a sawtooth generator forming part of the flowmeter illustrated in FIGS. 1 and 2.

The output waveform of the sawtooth generator 32 is shown in FIG. 3 from which it can be seen that this output consists of alternative half cycles in which zero output is produced and in which a linear sawtooth output is produced. The length of each half cycle is chosen to be not less than the visual resolution time of the audio spectrum analyzer 20.

Figure 4:
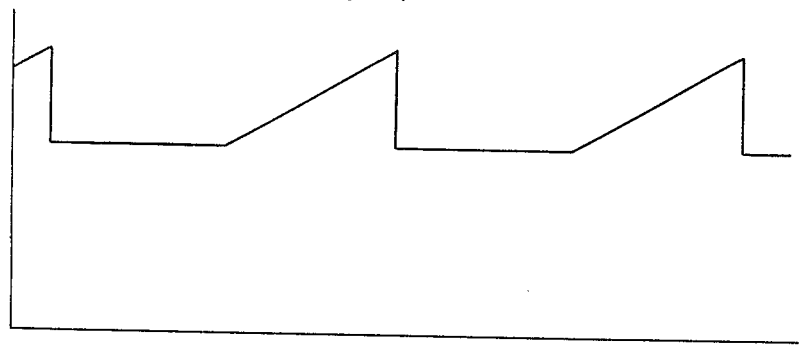
FIG. 4 is a waveform diagram illustrating the control signal applied to the variable frequency oscillator of the apparatus shown in FIGS. 1 and 2.

FIG. 4 shows the output waveform from the adder 30. The magnitude of the d.c. pedestal derived from the unit 34 is chosen to be such that the average voltage applied to the variac diode 26 is that which is required to tune the oscillator 10 to the resonant frequency of the transducer 12. This ensures that the resulting frequency sweep is linear.

Figure 5:
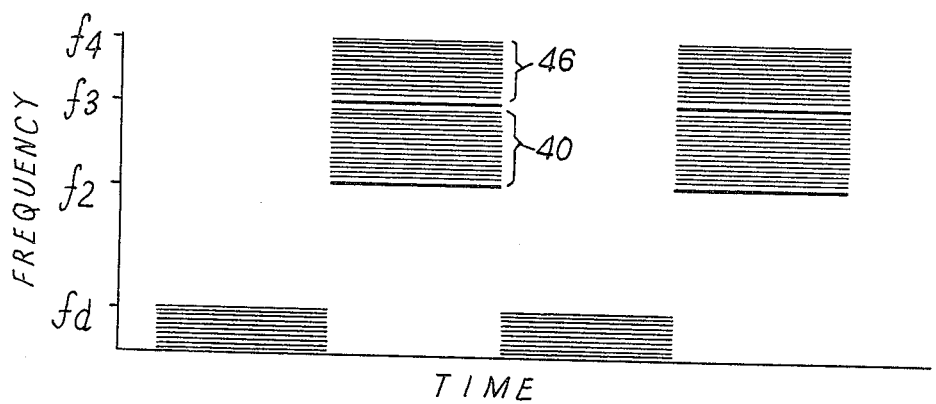
FIG. 5 is a sonagram consisting of the output of the audio spectrum analyzer of the flowmeter shown in FIGS. 1 and 2 corresponding to the waveform illustrated in FIG. 4.

FIG. 5 is a sonagram produced by the audio spectrum analyzer 20 when blood flow in a vessel of larger diameter than the beam width of the transducer 12 is to be determined. During the half cycles when the output from the ramp generator 22 is constant, the only cause of frequency shifting is the doppler effect and consequently only reflections from moving objects such as blood corpuscles produce an output trace on the sonagram. Under these circumstances, if the transmitted signal from the transducer 12 is of frequency $f_o$, the signals received by the transducer 16 have frequencies ranging from $f_o$ either to $(f_o + f_d)$ or to $(f_o - f_d)$ depending on the direction of flow where $f_d$ is the doppler shift frequency received from the fastest moving corpuscles. Consequently, the mixer produces output signals of frequencies ranging from $f_d$ to 0 regardless of the direction of flow. The maximum speed of flow can be calculated from a knowledge of $f_d$ and the angle between the beam of the transducer 12 and the direction of blood flow in the conventional way.

During the half cycles when a sawtooth voltage is applied to the oscillator 10 by the ramp generator 22, the frequency of the output signal from the oscillator 10 is, of course, constantly changing. Consequently, when a reflection from a stationary object is detected by the transducer 16, there will exist a frequency difference between the received signal $f_r$ received by the mixer 14 from the transducer 16 and the instantaneous frequency $f_t$ from the oscillator 10 given by $$(f_t - f_r) = \frac{2 \frac{R}{C}}{} \cdot \frac{df}{dt}$$

where $R$ is the range of the object giving rise to the reflection from the transducers 12 and 16 and C is the velocity of sound in human tissue. The resulting output signal from the mixer 14 is at a frequency equal to this frequency difference. The heavy lines at frequencies $f_2$ and $f_3$ in the sonagram of FIG. 5, are caused by reflections from the near and far walls respectively of the blood vessel being studied. Thus, it can be seen that the diameter D of this blood vessel is given by:

$$D = \frac{C}{2 \frac{df}{dt}} (f_3 - f_2).$$

$df/dt$ is the slope of the ramp and is therefore a constant.

During the sawtooth part of the input waveform, reflections from moving blood corpuscles in the vessel give rise to outputs from the low pass filter 18 both due to their range and due to the doppler shift caused by their velocity. Assuming that the flow direction is towards the probe, the output signal from the filter 18 ($f_{out}$) is given by:

$$f_{out} = \left| (f_r + \frac{2R}{C} \cdot \frac{df}{dt}) - (f_r - f_d) \right|$$
$$= \left| \frac{2R}{C} \cdot \frac{df}{dt} - f_d \right|$$

By suitable choice of the slope of the sawtooth waveform $df/dt$ it can be arranged that the frequency shift due to range $$\frac{2R}{C} \cdot \frac{df}{dt}$$

is always greater than the doppler shift frequency $f_d$. The output frequency from the filter 18 is then given by:

$$f_{out} = \frac{2R}{C} \cdot \frac{df}{dt} - f_d.$$

When the flow direction is away from the probe, the output frequency is given by:

$$f_{out} = \frac{2R}{C} \cdot \frac{df}{dt} + f_d.$$

Thus, since the doppler shift frequency $f_d$ can be determined during the half cycles when the output from the ramp generator 22 is constant, both the flow direction and the range of the sources of reflection can be determined. In the sonagram shown in FIG. 5, the bands of line 40 and 46 are due to reflections from moving blood corpuscles.

The maximum doppler shift frequency $f_4$, which is indicated by the one furthest from the near wall frequency $f_2$, corresponds to the flow down the center of the vessel. In FIG. 5, the frequency $f_4$ is higher than half-way between the frequencies $f_2$ and $f_3$. Thus, the doppler frequency difference has increased the frequency difference due to range and consequently the flow direction is away from the probe. If the flow was in the opposite direction, the maximum doppler shift frequency would be less than half-way between $f_2$ and $f_3$ and if the flow was fast enough, could be less than $f_2$.

Thus the rate of volume flow $dV/dt$ is given by:

$$\frac{dV}{dt} = a \left( \frac{c \cdot \overline{f_4 - f_2}}{2 \frac{df}{dt}} \right)^2 \cdot bf_d$$

when $a$ is a constant dependent on the shape of the velocity flow profile and $b$ is a constant relating flow velocity to doppler shift.

Figure 6:
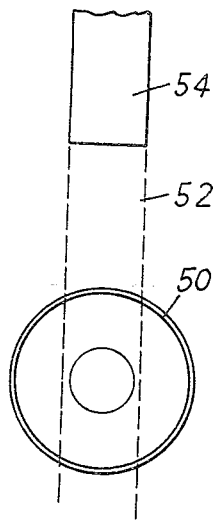
FIGS. 6 and 7 are transverse and longitudinal section diagrams respectively illustrating a parabolic flow profile.
Figure 7:
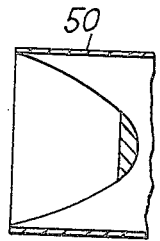
Figure 9:
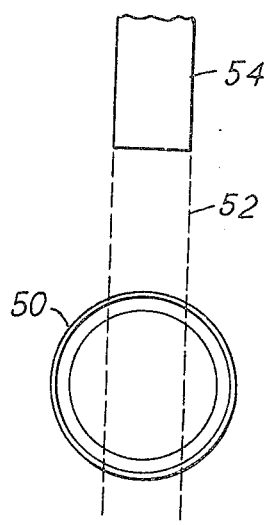
FIGS. 9 and 10 are transverse and longitudinal sectional diagrams illustrating the flow of a liquid having a flat flow profile.
Figure 10:
Figure 8:
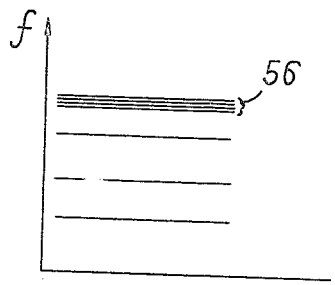
FIG. 8 is part of a sonagram with a liquid having a flow profile as illustrated in FIGS. 6 and 7.

Thus, in order to calculate the flow volume, it is necessary to know the shape of the velocity flow profile. Assumption that this profile is parabolic when it is in fact flat leads to an error of 50 percent in the calculated flow volume rate. FIGS. 6 and 7 illustrate the flow of a liquid with a parabolic flow velocity profile through a duct 50. A beam 52, narrower than the diameter of the duct 50, is directed across the center of the duct from an ultrasonic transducer 54. Only in a small central region of the profile does the velocity of flow exceed an arbitrary threshold $v$ which is close to the maximum flow velocity. FIG. 8 shows part of a sonagram of such a flow profile relating to a half cycle of the output from the ramp generator 22 during which a sawtooth output is produced. During one resolution period of the audio spectrum analyzer 20, more corpuscles pass through the centre of the duct, where the flow rate is higher than the threshold $v$ than pass through the outer regions. Consequently a stronger reflected signal is reached from this region and, since the variation of range of this region is relatively small, the resulting sonagram shows a relatively narrow frequency spread as shown in FIG. 8 where the lines 56 correspond to the region where flow rate exceeds the threshold $v$.

Figure 11:
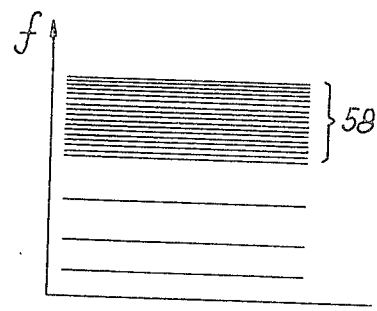
FIG. 11 is part of a sonagram obtained when measuring flow of a liquid having a flow profile as illustrated in FIGS. 9 and 10.

In contrast, where a liquid having a relatively flat profile flows through the duct 50, the area over which the threshold $v$ is exceeded extends across most of the duct. As a result, the region from which a high number of reflections is obtained extends over a much larger depth range, leading to a spreading of the principal lines of the sonagram as shown at 58 in FIG. 11.

In addition to measurement of flow volume rates, the apparatus can also be used to produce longitudinal cross-sections of blood vessels. The transducers are scanned along the length of a vessel whose cross section is to be determined at a rate related to the time axis of the audio spectrum analyzer. the side wall range signals then constitute a longitudinal cross-sectional view of the blood vessel concerned.

We claim:

1. An ultrasonic flowmeter comprising a transmitting transducer, a variable frequency oscillator having its output connected to the input of the transmitting transducer, a receiving transducer arranged to receive reflections and scattering of signals from the transmitting transducer, an audio spectrum analyzer, difference signal means responsive to the receiving transducer for supplying to said audio spectrum analyzer difference signals of frequency equal to the difference between the frequency of the signal transmitted by the transmitting transducer and the reflected and scattered signals received by the receiving transducer, and control means for generating a control signal for the variable frequency oscillator, such control signal comprising periods of linearly varying level.

2. An ultrasonic flowmeter as claimed in claim 1 in which the receiving transducer is arranged to receive a signal direct from said transmitting transducer, said difference signal means comprising a filter arranged to reject frequencies in the range of frequencies produced by the variable frequency oscillator and to pass said difference signals.

3. An ultrasonic flowmeter as claimed in claim 1, in which the difference signal means comprises a mixer having a first input connected to the output of the variable frequency oscillator and a second input connected to the output of the receiving transducer and a filter connecting the output of the mixer to the input of the audio spectrum analyzer and arranged to reject signals of frequency in the range of frequencies produced by the variable frequency oscillator and to pass said difference signals.

4. An ultrasonic flowmeter as claimed in claim 1, in which the control means is arranged to generate a control signal comprising periods of constant level and periods of linearly varying level.

5. An ultrasonic flowmeter as claimed in claim 4, in which the receiving transducer is arranged to receive a direct signal from the transmitting transducer and the difference signal means comprises a filter arranged to reject signals in the range of frequencies produced by the variable frequency oscillator and to pass said difference signals.

6. An ultrasonic flowmeter as claimed in claim 4, in which the difference signal means comprises a mixer having a first input connected to the output of the variable frequency oscillator and a second input connected to the output of the receiving transducer and a filter connecting the output of the mixer to the input of the audio spectrum analyzer and arranged to reject signals in the range of frequencies produced by the variable frequency oscillator and to pass said difference signals.

7. A method of measuring the volume flow through a duct employing an ultrasonic flowmeter having a transmitting transducer, a receiving transducer disposed to receive reflection and scattering of signals from said transmitting transducer, an audio spectrum analyzer and means for supplying to said audio spectrum analyzer a difference signal of frequency equal to the difference between the frequency of the signal transmitted by the transmitting transducer and the reflected and scattered signals received by the receiving transducer, comprising successively applying an ultrasonic signal of constant frequency to the transmitting transducer to measure the velocity of flow of liquid in the duct and applying an ultrasonic signal of linearly varying frequency to the transmitting transducer to measure the diameter of the duct.

8. A method of measuring the rate of volume flow through a duct as claimed in claim 7, employing a transmitting transducer having a beam width narrower than that diameter of the duct, comprising measuring the range of distances from the transducer over which the flow velocity in the duct is close to maximum while the linearly varying ultrasonic signal is applied to the transmitting transducer, to determine the flow profile of the liquid in the duct.

* * * * *

UNITED STATES PATENT OFFICE
CERTIFICATE OF CORRECTION

PATENT NO. : 3,901,077
DATED : August 26, 1975
INVENTOR(S) : Kenneth McCarty and John Patrick Woodcock It is certified that error appears in the above-identified patent and that said Letters Patent are hereby corrected as shown below:

<u>In the Heading</u>

Item [30] Foreign Application Priority Data change "May 4, 1974" to --March 4, 1974--

Signed and Sealed this twenty-third Day of December 1975

[SEAL]

Attest:

RUTH C. MASON
*Attesting Officer*

C. MARSHALL DANN
*Commissioner of Patents and Trademarks*